(12) United States Patent
Shahana

(10) Patent No.: US 12,116,080 B2
(45) Date of Patent: Oct. 15, 2024

(54) CONTROL DEVICE FOR HUMAN-POWERED VEHICLE

(71) Applicant: Shimano Inc., Osaka (JP)

(72) Inventor: Satoshi Shahana, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 18/366,349

(22) Filed: Aug. 7, 2023

(65) Prior Publication Data
US 2024/0083544 A1   Mar. 14, 2024

(30) Foreign Application Priority Data
Sep. 9, 2022 (JP) ................. 2022-144033

(51) Int. Cl.
   *B62M 25/08* (2006.01)
   *B62J 45/412* (2020.01)
   *B62M 9/123* (2010.01)

(52) U.S. Cl.
CPC ............ *B62M 25/08* (2013.01); *B62J 45/412* (2020.02)

(58) Field of Classification Search
CPC ...... B62M 25/08; B62M 9/123; B62J 45/412; B62J 45/411; B62J 45/413; B62J 45/4152
See application file for complete search history.

(56) References Cited

U.S. PATENT DOCUMENTS 11,014,630 B2 * 5/2021 Shahana .................. B62J 43/30

FOREIGN PATENT DOCUMENTS

| DE | 102021113176 A1 * | 12/2021 | ............ B62M 25/08 |
| JP | 2013-47085 A | 3/2013 | |
| JP | 2014-151745 A | 8/2014 | |
| JP | 2020-125066 A | 8/2020 | |
| JP | 2021187299 A * | 12/2021 | ............ B62M 9/123 |
| JP | 2022124357 A * | 8/2022 | ............ B62M 25/08 |

* cited by examiner

*Primary Examiner* — Tisha D Lewis
(74) *Attorney, Agent, or Firm* — Global IP Counselors, LLP

(57) ABSTRACT

A human-powered vehicle control device includes an electronic controller that controls a transmission device to shift a ratio of a rotational speed of a wheel to a rotational speed of a crank axle. The controller controls the transmission device between first, second, and third control states. The controller controls the transmission device in the first control state for a predetermined period in a case where the human-powered vehicle starts to travel until a vehicle state becomes a predetermined state. The controller switches from the first to the second control state if the vehicle state becomes the predetermined state. The controller switches from the first to the third control state if a human driving force input to the human-powered vehicle becomes greater than a predetermined driving force during the predetermined period. Shifting of the ratio is more restricted in the first control state than the second and third control states.

19 Claims, 5 Drawing Sheets

CONTROL DEVICE FOR HUMAN-POWERED VEHICLE

CROSS-REFERENCE TO RELATED APPLICATIONS

This application claims priority to Japanese Patent Application No. 2022-144033, filed on Sep. 9, 2022. The entire disclosure of Japanese Patent Application No. 2022-144033 is hereby incorporated herein by reference.

BACKGROUND

Technical Field

The present disclosure generally relates to a control device for a human-powered vehicle.

Background Information

One example of a control device for a human-powered vehicle is disclosed in Japanese Laid-Open Patent Publication No. 2014-151745 (Patent Document 1). The control device of Patent Document 1 is configured to controls a transmission device.

SUMMARY

An object of the present disclosure is to provide a control device for a human-powered vehicle that controls a transmission device in a preferred manner in a case where the human-powered vehicle starts to travel.

A control device in accordance with a first aspect of the present disclosure is for a human-powered vehicle. The control device comprises a controller configured to control a transmission device that shifts a ratio of a rotational speed of a wheel of the human-powered vehicle to a rotational speed of a crank axle of the human-powered vehicle. The electronic controller is configured to control the transmission device in one of a first control state, a second control state, and a third control state. The electronic controller is configured to control the transmission device in the first control state for a predetermined period in a case where the human-powered vehicle starts to travel until a vehicle state of the human-powered vehicle becomes a predetermined state. The electronic controller is configured to switch from the first control state to the second control state in a case where the vehicle state becomes the predetermined state. The electronic controller is configured to switch from the first control state to the third control state in a case where a human driving force input to the human-powered vehicle becomes greater than a predetermined driving force during the predetermined period. Shifting of the ratio is more restricted in the first control state than the second control state and the third control state.

The control device according to the first aspect restricts shifting of the ratio for the predetermined period in a case where the human-powered vehicle starts to travel. Thus, the rider is less likely to feel awkward in a case where the human-powered vehicle starts to travel. Therefore, the transmission device is controlled in a preferred manner in a case where the human-powered vehicle starts to travel. With the control device according to the first aspect, in a case where the human-powered vehicle starts to travel, the ratio is easily shifted even during the predetermined period if the human driving force becomes greater than the predetermined driving force. This controls the transmission device in a preferred manner.

In accordance with a second aspect of the present disclosure, the control device according to the first aspect is configured so that shifting that decreases the ratio is more restricted in the first control state than the second control state.

The control device according to the second aspect restricts shifting that decreases the ratio for the predetermined period in a case where the human-powered vehicle starts to travel. Thus, the rider is less likely to feel awkward.

In accordance with a third aspect of the present disclosure, the control device according to the first aspect is configured so that shifting that decreases the ratio is more restricted in the first control state than the third control state.

With the control device according to the third aspect, in a case where the human-powered vehicle starts to travel, the ratio is easily shifted to decrease even during the predetermined period if the human driving force becomes greater than the predetermined driving force.

In accordance with a fourth aspect of the present disclosure, the control device according to the first aspect is configured so that shifting that decreases the ratio is more restricted in the first control state than the second control state and the third control state.

The control device according to the fourth aspect restricts shifting that decreases the ratio for the predetermined period in a case where the human-powered vehicle starts to travel. Further, the control device allows the ratio to be easily shifted to decrease even during the predetermined period in a case where the human driving force becomes greater than the predetermined driving force.

In accordance with a fifth aspect of the present disclosure, the control device according to any one of the first to fourth aspects is configured so that the predetermined state includes a state in which vehicle speed is greater than or equal to a first vehicle speed.

The control device according to the fifth aspect restricts shifting of the ratio until the vehicle speed becomes greater than or equal to the first vehicle speed.

In accordance with a sixth aspect of the present disclosure, the control device according to any one of the first to fifth aspects is configured so that the predetermined state includes a state in which an action request for the transmission device is generated.

The control device according to the sixth aspect restricts shifting of the ratio until an action request for the transmission device is generated.

In accordance with a seventh aspect of the present disclosure, the control device according to any one of the first to sixth aspects is configured so that the predetermined state includes a state in which the rotational speed of the crank axle is greater than or equal to a first rotational speed.

The control device according to the seventh aspect restricts shifting of the ratio until the rotational speed of the crank axle becomes greater than or equal to the first rotational speed.

In accordance with an eighth aspect of the present disclosure, the control device according to any one of the first to seventh aspects is configured so that the predetermined state includes a state in which distance traveled by the human-powered vehicle from a point of time at which the human-powered vehicle starts to travel is greater than or equal to a predetermined distance traveled.

The control device according to the eighth aspect restricts shifting of the ratio until the distance traveled by the human-powered vehicle from the point of time at which the human-powered vehicle starts to travel becomes greater than or equal to the predetermined distance traveled.

In accordance with a ninth aspect of the present disclosure, the control device according to any one of the first to eighth aspects is configured so that the electronic controller is configured to switch from the first control state to the third control state in a case where the human driving force is greater than a predetermined driving force and a vehicle speed is less than or equal to a second vehicle speed during the predetermined period.

With the control device according to the ninth aspect, the ratio is easily shifted even during the predetermined period in a case where the human driving force is greater than the predetermined driving force and the vehicle speed is less than or equal to the second vehicle speed.

In accordance with a tenth aspect of the present disclosure, the control device according to any one of the first to ninth aspects is configured so that the electronic controller is configured to switch from the first control state to the third control state in a case where the human driving force is greater than a predetermined driving force and an acceleration value of the human-powered vehicle is less than or equal to a first acceleration value during the predetermined period.

With the control device according to the tenth aspect, the ratio is easily shifted even during the predetermined period in a case where the human driving force is greater than the predetermined driving force and the acceleration value is less than or equal to the first acceleration value.

In accordance with an eleventh aspect of the present disclosure, the control device according to any one of the first to tenth aspects is configured so that the electronic controller is configured to switch from the first control state to the third control state in a case where the human driving force is greater than a predetermined driving force and the rotational speed of the crank axle is less than or equal to a second rotational speed during the predetermined period.

With the control device according to the eleventh aspect, the ratio is easily shifted even during the predetermined period in a case where the human driving force is greater than the predetermined driving force and the rotational speed of the crank axle is less than or equal to the second rotational speed.

In accordance with a twelfth aspect of the present disclosure, the control device according to any one of the first to eleventh aspects is configured so that the electronic controller is configured to switch from the first control state to the third control state in a case where the human driving force is greater than a predetermined driving force and a gradient of a road traveled by the human-powered vehicle is greater than or equal to a predetermined gradient during the predetermined period.

With the control device according to the twelfth aspect, the ratio is easily shifted even during the predetermined period in a case where the human driving force is greater than the predetermined driving force and the gradient of a road traveled by the human-powered vehicle is greater than or equal to the predetermined gradient.

In accordance with a thirteenth aspect of the present disclosure, the control device according to any one of the first to twelfth aspects is configured so that the electronic controller is configured to switch from the first control state to the third control state in a case where the human driving force is greater than a predetermined driving force and the ratio is greater than or equal to a predetermined ratio during the predetermined period.

With the control device according to the thirteenth aspect, the ratio is easily shifted even during the predetermined period in a case where the human driving force is greater than the predetermined driving force and the ratio is greater than or equal to the predetermined ratio.

A control device in accordance with a fourteenth aspect of the present disclosure is for a human-powered vehicle. The control device comprises a controller configured to control a transmission device that shifts a ratio of a rotational speed of a wheel of the human-powered vehicle to a rotational speed of a crank axle of the human-powered vehicle. The electronic controller is configured to control the transmission device in one of a first control state, a second control state, and a third control state. The electronic controller is configured to control the transmission device in the first control state for a predetermined period in a case where the human-powered vehicle starts to travel until a vehicle state of the human-powered vehicle becomes a first predetermined state. The electronic controller is configured to switch from the first control state to the second control state in a case where the vehicle state becomes the first predetermined state. The electronic controller is configured to switch from the first control state to the third control state in a case where the vehicle state becomes a second predetermined state during the predetermined period. Shifting of the ratio is more restricted in the first control state than the second control state and the third control state. The first predetermined state includes at least one of a state in which a vehicle speed is greater than or equal to a first vehicle speed, a state in which an action request for the transmission device is generated, a state in which the rotational speed of the crank axle is greater than or equal to a first rotational speed, and a state in which a distance travelled by the human-powered vehicle from a point of time at which the human-powered vehicle starts to travel is greater than or equal to a predetermined distance traveled. The second predetermined state includes a state in which a human driving force input to the human-powered vehicle is greater than a predetermined driving force and at least one of a state in which the vehicle speed is less than a second vehicle speed that is lower than the first vehicle speed, a state in which an acceleration value of the human-powered vehicle is less than or equal to a first acceleration value, a state in which the rotational speed of the crank axle is less than or equal to a second rotational speed that is lower than the first rotational speed, a state in which a gradient of a road traveled by the human-powered vehicle is greater than or equal to a predetermined gradient, and a state in which the ratio is greater than or equal to a predetermined ratio.

The control device according to the fourteenth aspect restricts shifting of the ratio for the predetermined period in a case where the human-powered vehicle starts to travel. Thus, the rider is less likely to feel awkward in a case where the human-powered vehicle starts to travel. Therefore, the transmission device is controlled in a preferred manner in a case where the human-powered vehicle starts to travel. With the control device according to the fourteenth aspect, in a case where the human-powered vehicle starts to travel, the ratio is easily shifted even during the predetermined period if the vehicle state becomes the second predetermined state. This controls the transmission device in a preferred manner.

In accordance with a fifteenth aspect of the present disclosure, the control device according to any one of the first to fourteenth aspects is configured so that the electronic controller is configured to control the transmission device in accordance with a shifting condition in the first control state, the second control state, and the third control state.

The control device according to the fifteenth aspect controls the transmission device in accordance with the shifting condition in any one of the first control state, the second control state, and the third control state.

In accordance with a sixteenth aspect of the present disclosure, the control device according to the fifteenth aspect is configured so that the shifting condition is related to at least one of a traveling state of the human-powered vehicle and a traveling environment of the human-powered vehicle.

The control device according to the sixteenth aspect controls the transmission device in accordance with at least one of the traveling state of the human-powered vehicle and the traveling environment of the human-powered vehicle in any one of the first control state, the second control state, and the third control state.

In accordance with a seventeenth aspect of the present disclosure, the control device according to the fifteenth or sixteenth aspect is configured so that the shifting condition includes at least one of the rotational speed of the crank axle, the human driving force, and the vehicle speed.

The control device according to the seventeenth aspect controls the transmission device in accordance with at least one of the rotational speed of the crank axle, the human driving force, and the vehicle speed in any one of the first control state, the second control state, and the third control state.

In accordance with an eighteenth aspect of the present disclosure, the control device according to any one of the fifteenth to seventeenth aspects is configured so that the shifting condition includes the rotational speed of the crank axle. The electronic controller is configured to control the transmission device to increase the ratio in a case where the rotational speed of the crank axle is greater than an upper limit threshold value. The electronic controller is configured to control the transmission device to decrease the ratio in a case where the rotational speed of the crank axle is less than a lower limit threshold value.

The control device according to the eighteenth aspect controls the transmission device such that the ratio increases in a case where the rotational speed of the crank axle is greater than the upper limit threshold value and such that the ratio decreases in a case where the rotational speed of the crank axle is less than the lower limit threshold value in any one of the first control state, the second control state, and the third control state.

In accordance with a nineteenth aspect of the present disclosure, the control device according to any one of the first to eighteenth aspects is configured so that the electronic controller is configured to select either one of a first mode and a second mode. The predetermined driving force for a case where the first mode is selected differs from the predetermined driving force for a case where the second mode is selected.

The control device according to the nineteenth aspect selects either one of the first mode and the second mode and controls the transmission device in accordance with different predetermined driving forces.

The control device for a human-powered vehicle of the present disclosure controls the transmission device in a preferred manner in a case where the human-powered vehicle starts to travel.

BRIEF DESCRIPTION OF THE DRAWINGS

Referring now to the attached drawings which form a part of this original disclosure.

DETAILED DESCRIPTION

Figure 1:
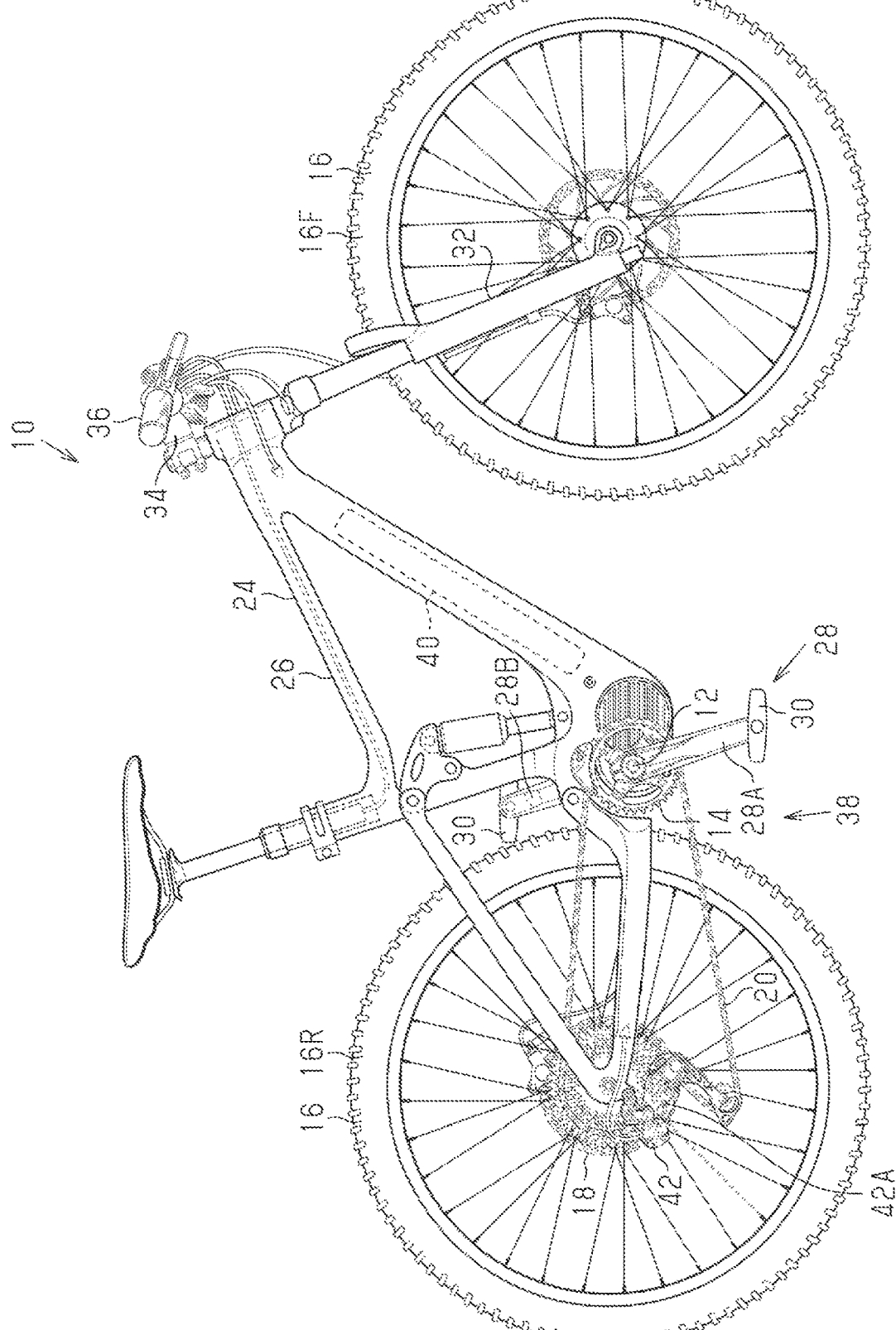
FIG. 1 is a side elevational view of a human-powered vehicle including a human-powered vehicle control device for the human-powered vehicle in accordance with an embodiment.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Embodiment

A human-powered vehicle control device 60 (hereinafter referred to simply as the control device 60) for a human-powered vehicle will now be described with reference to FIGS. 1 to 4. A human-powered vehicle is a vehicle that has at least one wheel and can be driven by at least a human driving force. Examples of the human-powered vehicle include various types of bicycles such as a mountain bike, a road bike, a city bike, a cargo bike, a handcycle, and a recumbent bike. There is no limit to the number of wheels of the human-powered vehicle. The human-powered vehicle also includes, for example, a unicycle or a vehicle having two or more wheels. The human-powered vehicle is not limited to a vehicle that can be driven only by a human driving force. The human-powered vehicle includes an electric bicycle (E-bike) that uses a drive force of an electric motor for propulsion in addition to the human driving force. The E-bike includes an electric assist bicycle that assists in propulsion with an electric motor. In the embodiment described hereafter, the human-powered vehicle will be described as a bicycle.

A human-powered vehicle 10 includes a crank axle 12, a first rotational body 14, a wheel 16, a second rotational body 18, and a transmission body 20. The crank axle 12 is configured to receive a human driving force. The first rotational body 14 is coupled to the crank axle 12. The second rotational body 18 is coupled to the wheel 16. The transmission body 20 is engaged with the first rotational body 14 and the second rotational body 18, and is configured to transmit a driving force between the first rotational body 14 and the second rotational body 18.

The human-powered vehicle 10 further includes, for example, a vehicle body 24. The vehicle body 24 includes, for example, a frame 26. The wheel 16 includes, for example, a front wheel 16F and a rear wheel 16R. The crank axle 12 is, for example, rotatable relative to the frame 26. The human-powered vehicle 10 includes, for example, a crank 28. The crank 28 includes the crank axle 12 and two crank arms 28A and 28B. For example, the crank arm 28A is provided on a first axial end of the crank axle 12, and the crank arm 28B is provided on a second axial end of the crank axle 12. The human-powered vehicle 10 includes, for example, two pedals 30. For example, one of the two pedals 30 is coupled to the crank arm 28A. The other one of the two pedals 30 is coupled to the crank arm 28B. For example, the rear wheel 16R is driven by rotation of the crank axle 12. For example, the rear wheel 16R is supported by the frame 26.

The front wheel 16F is attached to the frame 26 by a front fork 32. A handlebar 36 is connected to the front fork 32 by a stem 34.

The human-powered vehicle 10 further includes, for example, a drive mechanism 38. For example, at least one of the front wheel 16F and the rear wheel 16R is connected to the crank 28 by the drive mechanism 38. In the present embodiment, the rear wheel 16R is connected to the crank 28 by the drive mechanism 38.

The drive mechanism 38 includes, for example, at least one first rotational body 14, at least one second rotational body 18, and the transmission body 20. The at least one first rotational body 14 is coupled to the crank axle 12. The at least one second rotational body 18 is coupled to the wheel 16. The transmission body 20 is engaged with the at least one first rotational body 14 and the at least one second rotational body 18 and is configured to transmit driving force between the at least one first rotational body 14 and the at least one second rotational body 18. For example, the transmission body 20 transmits the rotational force of the at least one first rotational body 14 to the at least one second rotational body 18.

The at least one first rotational body 14 is, for example, arranged coaxially with the crank axle 12. The at least one first rotational body 14 does not have to be arranged coaxially with the crank axle 12. In a case where the at least one first rotational body 14 is not arranged coaxially with the crank axle 12, for example, the at least one first rotational body 14 is coupled to the crank axle 12 by a first transmission mechanism. The first transmission mechanism can include a set of gears, a set of sprockets and a chain, a set of pulleys and a belt, or a set of a shaft and bevel gears. The at least one first rotational body 14 includes, for example, at least one first sprocket.

The at least one second rotational body 18 is, for example, arranged coaxially with the rear wheel 16R. The at least one second rotational body 18 does not have to be arranged coaxially with the rear wheel 16R. In a case where the at least one second rotational body 18 is not arranged coaxially with the rear wheel 16R, for example, the at least one second rotational body 18 is coupled to the rear wheel 16R by a second transmission mechanism. The second transmission mechanism can include a set of gears, a set of sprockets and a chain, a set of pulleys and a belt, or a set of a shaft and bevel gears. The at least one second rotational body 18 includes, for example, at least one second sprocket.

The at least one second rotational body 18 is coupled to the rear wheel 16R by a one-way clutch. The one-way clutch includes, for example, at least one of a roller clutch, a sprag clutch, and a ratchet clutch. The one-way clutch is configured to transmit driving force from the second rotational body 18 to the rear wheel 16R in a case where the second rotational body 18 is rotated in accordance with the forward rotation of the first rotational body 14. Further, the one-way clutch is configured to allow relative rotation of the rear wheel 16R and the second rotational body 18 in a case where the speed at which the rear wheel 16R is rotated forward is greater than the speed at which the second rotational body 18 is rotated forward.

The human-powered vehicle 10 further includes, for example, a battery 40. The battery 40 includes one or more battery cells. Each battery cell includes a rechargeable battery. For example, the battery 40 is configured to supply electric power to the control device 60 and a transmission device 42. For example, the battery 40 is connected to the control device 60 in a manner allowing for wired communication or wireless communication. The battery 40 is configured to establish communication with the control device 60 through, for example, power line communication (PLC), Controller Area Network (CAN), or universal asynchronous receiver/transmitter (UART).

The human-powered vehicle 10 further includes, for example, the transmission device 42. The transmission device 42 shifts a ratio R of a rotational speed of the wheel 16 of the human-powered vehicle 10 to a rotational speed of the crank axle 12 of the human-powered vehicle 10. For example, the transmission device 42 is provided in a transmission path of the human driving force in the human-powered vehicle 10 and is configured to shift the ratio R. For example, the ratio R is a ratio of the rotational speed of the wheel 16 to the rotational speed of the crank 28. The rotational speed of the wheel 16 includes, for example, the rotational speed of the drive wheel.

The transmission device 42 includes, for example, at least one of a derailleur 42A and an internal transmission device. The human-powered vehicle 10 of the present embodiment further includes the derailleur 42A. The transmission device 42 of the present embodiment includes the derailleur 42A. The derailleur 42A is configured to operate the transmission body 20 and shift the ratio R of the rotational speed of the wheel 16 to the rotational speed of the crank axle 12. The derailleur 42A includes, for example, at least one of a front derailleur and a rear derailleur. In a case where the derailleur 42A includes at least one of a front derailleur and a rear derailleur, the transmission body 20 includes a chain.

The derailleur 42A moves, for example, the transmission body 20 from a position engaged with one sprocket to a position engaged with another sprocket. In a case where the transmission device 42 includes an internal transmission device, for example, the internal transmission device is provided in a hub of the rear wheel 16R. The internal transmission device can include a continuously variable transmission device (CVT). The transmission device 42 includes, for example, an electric actuator 42B. The electric actuator 42B is, for example, configured to actuate the transmission device 42. The electric actuator 42B is, for example, configured to actuate the derailleur 42A.

The derailleur 42A is configured to operate the transmission body 20 and shift the ratio R of the rotational speed of the wheel 16 to the rotational speed of the crank axle 12. For example, the derailleur 42A is provided in the transmission path of the human driving force in the human-powered vehicle 10 and is configured to shift the ratio R. For example, the derailleur 42A operates the transmission body 20 and changes the engagement state between at least one of the at least one first rotational body 14 and the at least one second rotational body 18 and the transmission body 20 to shift the ratio R. The relationship of the ratio R, the rotational speed of the wheel 16, and the rotational speed of the crank axle 12 satisfies Equation (1). In Equation (1), the term "R" represents the ratio R. In Equation (1), the term "W" represents the rotational speed of the wheel 16. In Equation (1), the term "C" represents the rotational speed of the crank axle 12.

$$R = W(rpm)/C(rpm) \qquad \text{Equation (1):}$$

The derailleur 42A can shift the ratio R in accordance with, for example, at least one transmission stage. For example, the derailleur 42A is configured to operate the transmission body 20 and shift the at least one transmission stage. For example, the at least one transmission stage is set in accordance with at least one of the at least one first rotational body 14 and the at least one second rotational body 18. In a case where the at least one transmission stage includes a plurality of transmission stages, for example, a different ratio R is set to each transmission stage. For example, the ratio R increases as the transmission stage increases.

In an example in which the at least one first rotational body 14 includes multiple first rotational bodies 14 and the at least one second rotational body 18 includes multiple second rotational bodies 18, the transmission stage is set in accordance with a combination of one of the first rotational bodies 14 and one of the second rotational bodies 18. In an example in which the at least one first rotational body 14 includes a single first rotational body 14 and the at least one second rotational body 18 includes multiple second rotational bodies 18, the transmission stage is set in accordance with the number of the second rotational bodies 18. In an example in which the at least one first rotational body 14 includes multiple first rotational bodies 14 and the at least one second rotational body 18 includes a single second rotational body 18, the transmission stage is set in accordance with the number of the first rotational bodies 14.

The derailleur 42A moves, for example, the chain from a position engaged with one sprocket to a position engaged with another sprocket. For example, the combination of a first sprocket having the least teeth and a second sprocket having the most teeth corresponds to the smallest transmission stage obtainable by the derailleur 42A. For example, the combination of a first sprocket having the most teeth and a second sprocket having the least teeth corresponds to the largest transmission stage obtainable by the derailleur 42A.

In a case where the derailleur 42A includes a front derailleur, the first rotational bodies 14 include, for example, two or three first sprockets. The first rotational bodies 14 include, for example, two first sprockets.

In a case where the derailleur 42A includes a front derailleur, for example, the derailleur 42A is configured to move the transmission body 20 from one first rotational body 14 to another first rotational body 14 in a shifting operation. The front derailleur operates the transmission body 20 and changes the engagement state of the at least one first rotational body 14 and the transmission body 20 to shift the ratio R. The first rotational bodies 14 include, for example, the first sprockets.

In a case where the derailleur 42A includes a rear derailleur, the at least one second rotational body 18 includes the second sprockets. The number of the second sprockets is between two and twenty, inclusive. The second rotational bodies 18 include, for example, twelve second sprockets.

The human-powered vehicle 10 further includes, for example, a shift operation device 44. The shift operation device 44 is, for example, provided on the handlebar 36. The shift operation device 44 includes, for example, a first operation unit that increases the ratio R and a second operation unit that decreases the ratio R.

Figure 2:
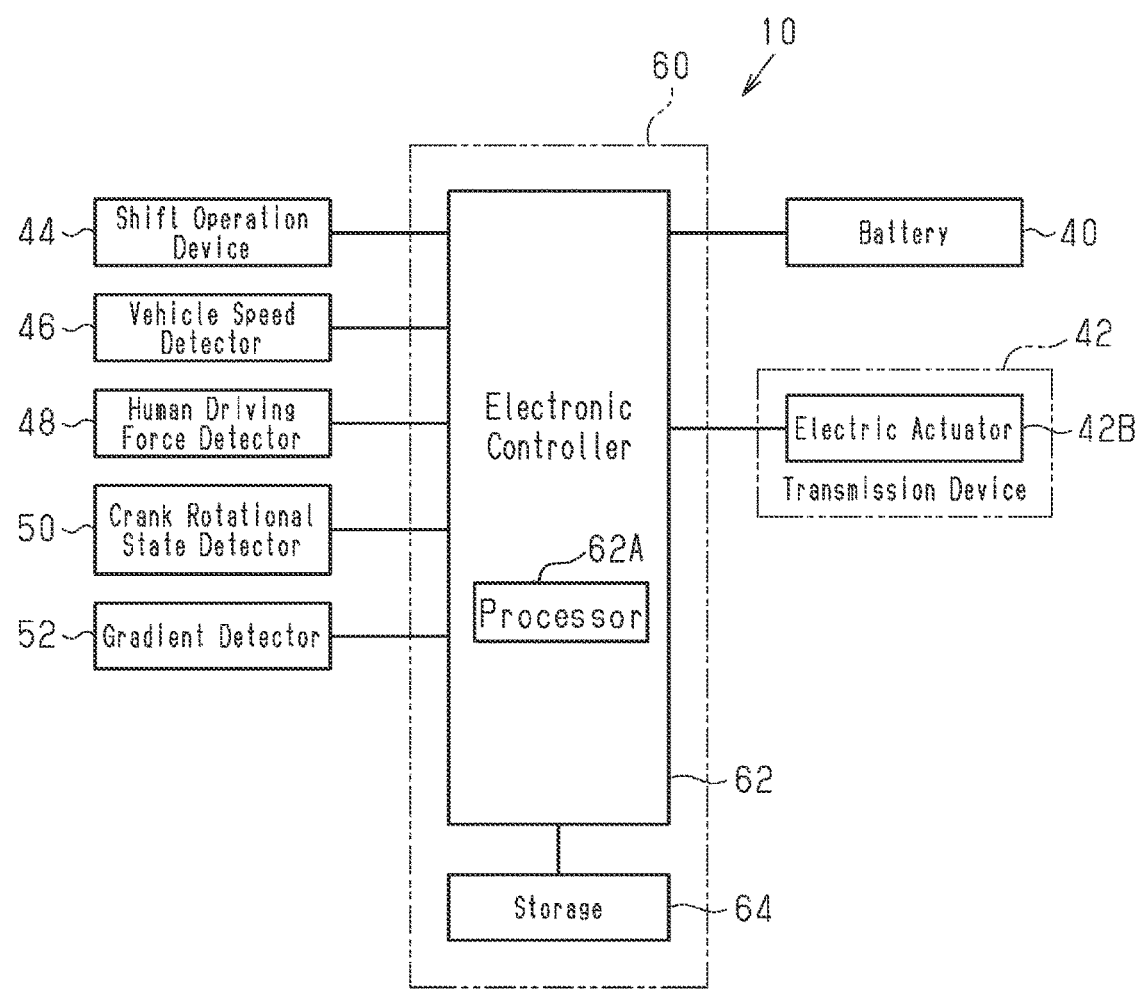
FIG. 2 is a block diagram showing the electrical configuration of the human-powered vehicle shown in FIG. 1.

As seen in FIG. 2, the human-powered vehicle 10 further includes one or more detectors for detecting one or more operating conditions of the human-powered vehicle 10. The term "detector" as used herein refers to a hardware device or instrument designed to detect the presence or absence of a particular event, object, substance, or a change in its environment, and to emit a signal in response. The term "detector" as used herein do not include a human being.

Also, as seen in FIG. 2, the human-powered vehicle 10 further includes an electronic controller 62. In particular, the control device 60 of the human-powered vehicle 10 includes the electronic controller 62. The electronic controller 62 is configured to receive input signals from various detectors as explained below.

The human-powered vehicle 10 further includes, for example, a vehicle speed detector 46. For example, the vehicle speed detector 46 is connected to the electronic controller 62 in a manner allowing for wired communication or wireless communication. The vehicle speed detector 46 is configured to detect, for example, information related to speed of the human-powered vehicle 10. The vehicle speed detector 46 is configured to detect, for example, information related to the rotational speed of the wheel 16. The vehicle speed detector 46 is configured to detect, for example, a magnet provided on at least one of the front wheel 16F and the rear wheel 16R.

The vehicle speed detector 46 is, for example, configured to output a predetermined number of detection signals during a period in which the wheel 16 completes one rotation. The predetermined number is, for example, one. The vehicle speed detector 46 outputs, for example, a signal corresponding to the rotational speed of the wheel 16. The electronic controller 62 can calculate the speed of the human-powered vehicle 10 based on the signal corresponding to the rotational speed of the wheel 16 and information related to the circumferential length of the wheel 16. The information related to the circumferential length of the wheel 16 is stored in storage 64.

The human-powered vehicle 10 further includes, for example, a human driving force detector 48. The human driving force detector 48 is connected to the electronic controller 62 in a manner allowing for wired communication or wireless communication. The human driving force detector 48 is configured to output a signal corresponding to the torque applied to the crank axle 12 by a human driving force. The signal corresponding to the torque applied to the crank axle 12 by the human driving force includes information related to the human driving force input to the human-powered vehicle 10.

The human driving force detector 48 is, for example, provided on a member included in the transmission path of the human driving force or a member disposed near the member included in the transmission path of the human driving force. The member included in the transmission path of the human driving force includes, for example, the crank axle 12 and a member that transmits human driving force between the crank axle 12 and the at least one first rotational body 14. For example, a power transmission portion is provided on an outer circumferential portion of the crank axle 12.

The human driving force detector 48 includes a strain sensor, a magnetostrictive sensor, a pressure sensor, or the like. A strain sensor includes a strain gauge. The human driving force detector 48 can have any configuration as long as information related to the human driving force is obtained.

The human driving force detector 48 can be provided on, for example, the crank arm 28A, the crank arm 28B, or at least one of the two pedals 30. In a case where the human driving force detector 48 is provided on at least one of the two pedals 30, the human driving force detector 48 can include, for example, a sensor that detects the pressure applied to the at least one of the two pedals 30. The human driving force detector 48 can be provided on, for example, the chain included in the transmission body 20. In a case where the human driving force detector 48 is provided on the chain, the human driving force detector 48 can include, for example, a sensor that detects the tension on the chain.

The human-powered vehicle 10 further includes, for example, a crank rotational state detector 50. For example, the crank rotational state detector 50 is connected to the electronic controller 62 in a manner allowing for wired communication or wireless communication. The crank rotational state detector 50 detects a rotational amount of at least one of the crank axle 12 and the at least one first rotational body 14. The crank rotational state detector 50 is configured to detect, for example, information corresponding to the rotational speed of the crank axle 12. The crank rotational state detector 50 is configured to detect, for example, information corresponding to a rotational speed of the at least one first rotational body 14. The information corresponding to the rotational speed of the crank axle 12 includes an angular acceleration of the crank axle 12. The information corresponding to the rotational speed of the at least one first rotational body 14 includes angular acceleration of the at least one first rotational body 14.

The crank rotational state detector 50 includes, for example, a magnetic sensor that outputs a signal corresponding to the strength of a magnetic field. The crank rotational state detector 50 includes a ring-shaped magnet having magnetic poles arranged in a circumferential direction. The ring-shaped magnet is provided on the crank axle 12, the at least one first rotational body 14, or a power transmission path extending from the crank axle 12 to the at least one first rotational body 14. The ring-shaped magnet includes, for example, one S-pole and one N-pole. The S-pole and the N-pole each continuously extend over 180° about the axis of the crank axle 12.

The crank rotational state detector 50 outputs, for example, a signal corresponding to at least one of the rotational speed of the crank axle 12 and the rotational speed of the at least one first rotational body 14. The crank rotational state detector 50 is, for example, configured to output a detection signal corresponding to rotational angle of the crank axle 12 during a period in which at least one of the crank axle 12 and the at least one first rotational body 14 completes one rotation. The crank rotational state detector 50 can include an optical sensor, an acceleration sensor, a gyro sensor, a torque sensor, or the like, instead of the magnetic sensor.

The crank rotational state detector 50 is, for example, provided on the frame 26 of the human-powered vehicle 10. In a case where the crank rotational state detector 50 is provided on the frame 26, the crank rotational state detector 50 can include, for example, a vehicle speed sensor. In a case where the crank rotational state detector 50 includes a vehicle speed sensor, the electronic controller 62 can be configured to calculate the rotational speed of the crank axle 12 based on the speed detected by the vehicle speed sensor and the ratio R.

The crank rotational state detector 50 can be configured to detect a rotational amount of the at least one second rotational body 18. The crank rotational state detector 50 can be configured to detect information corresponding to a rotational speed of the at least one second rotational body 18. The information corresponding to the rotational speed of the at least one second rotational body 18 includes, for example, an angular acceleration of the at least one second rotational body 18. The crank rotational state detector 50 can output, for example, a signal corresponding to the rotational speed of the at least one second rotational body 18.

The human-powered vehicle 10 further includes, for example, a gradient detector 52. The gradient detector 52 includes, for example, at least one of an inclination sensor and a global positioning system (GPS) receiver. An inclination sensor includes, for example, at least one of a gyro sensor and an acceleration sensor. In a case where the gradient detector 52 includes a GPS receiver, map information including information related to a road gradient is stored in the storage 64 in advance, and the electronic controller 62 obtains the road gradient at the present location of the human-powered vehicle 10.

As mentioned above, the human-powered vehicle control device 60 includes the electronic controller 62. The electronic controller 62 is formed of one or more semiconductor chips that are mounted on a circuit board. Thus, the terms "electronic controller" and "controller" as used herein refers to hardware that executes a software program, and does not include a human being. The electronic controller 62 includes, for example, one or more processors 62A that execute predetermined control programs. Each of the processors 62A of the electronic controller 62 includes, for example, a central processing unit (CPU) or a micro-processing unit (MPU).

The processors 62A of the electronic controller 62 can be located at, for example, separate positions. For example, some of the processors 62A can be located on the human-powered vehicle 10, while other ones of the processors 62A can be located in a server connected to the internet. In a case where the processors are located at separate positions, the processors are connected to one another via a wireless communication device in a manner allowing for communication. The electronic controller 62 can include one or more microcomputers.

The control device 60 further includes, for example, the storage 64. The storage 64 is any computer storage device or any non-transitory computer-readable medium with the sole exception of a transitory, propagating signal. For example, the storage 64 is connected to the electronic controller 62 in a manner allowing for wired communication or wireless communication. The storage 64 stores, for example, control programs and information used for control processes. The storage 64 includes, for example, a non-volatile memory and a volatile memory. The non-volatile memory includes, for example, at least one of a read-only memory (ROM), an erasable programmable read-only memory (EPROM), an electrically erasable programmable read-only memory (EEPROM), and a flash memory. The volatile memory includes, for example, a random-access memory (RAM).

The electronic controller 62 is configured to control the transmission device 42. The electronic controller 62 is configured to control the transmission device 42 in accordance with, for example, a shifting condition. In an example in which the shifting condition is satisfied, the electronic controller 62 operates the transmission device 42 and shifts the ratio R.

The shifting condition is related to, for example, at least one of a traveling state of the human-powered vehicle 10 and a traveling environment of the human-powered vehicle 10. The traveling state includes, for example, at least one of the rotational speed of the crank axle 12, the human driving force, and the vehicle speed. The traveling environment includes, for example, the gradient of a road traveled by the human-powered vehicle 10. At least one of the traveling state and the traveling environment includes, for example, traveling resistance. The traveling resistance includes, for example, at least one of air resistance, rolling resistance, gradient resistance, and acceleration resistance.

The shifting condition includes, for example, at least one of the rotational speed of the crank axle 12, the human driving force, and the vehicle speed. In the present embodiment, the shifting condition includes the rotational speed of the crank axle 12. For example, the electronic controller 62 is configured to control the transmission device 42 such that the transmission device 42 increases the ratio R in a case where the rotational speed of the crank axle 12 is greater than an upper limit threshold value. Further, the electronic controller 62 is configured to control the transmission device 42 such that the transmission device 42 decreases the ratio R in a case where the rotational speed of the crank axle 12 is less than a lower limit threshold value.

In a case where the shifting condition includes human driving force, for example, the shifting condition is satisfied if the human driving force is outside a first range. In a case where the shifting condition includes vehicle speed, for example, the shifting condition is satisfied if the vehicle speed is outside a second range.

The shifting condition includes, for example, at least one of the gradient of a road traveled by the human-powered vehicle 10 and the traveling resistance of the human-powered vehicle 10. In a case where the shifting condition includes the gradient of a road traveled by the human-powered vehicle 10, for example, the shifting condition is satisfied if the road gradient is outside a third range. In a case where the shifting condition includes the traveling resistance of the human-powered vehicle 10, for example, the shifting condition is satisfied if the traveling resistance is outside a fourth range.

The electronic controller 62 is configured to control the transmission device 42 in one of a first control state, a second control state, and a third control state. For example, the electronic controller 62 is configured to control the transmission device 42 in accordance with the shifting condition in the first control state, the second control state, and the third control state. For example, the second control state is the same as the third control state. The second control state can differ from the third control state. For example, the electronic controller 62 changes the range included in the shifting condition to set the control state to one of the first control state, the second control state, and the third control state.

In a case where the shifting condition includes the rotational speed of the crank axle 12, for example, the electronic controller 62 decreases the lower limit threshold value to restrict shifting that decreases the ratio R. In a case where the shifting condition includes the rotational speed of the crank axle 12, for example, the electronic controller 62 increases the upper limit threshold value to restrict shifting that increases the ratio R. In a case where the electronic controller 62 restricts shifting of the ratio R, the electronic controller 62 can prohibit shifting of the ratio R without changing the range included in the shifting condition.

In the first control state, for example, the shifting condition includes a threshold value suitable for a case where the human-powered vehicle 10 starts to travel. In the second control state, for example, the shifting condition includes a threshold value suitable for a case where the human-powered vehicle 10 is stably traveling. In the third control state, for example, the shifting condition includes a threshold value suitable for a case where the human-powered vehicle 10 is stably traveling.

The electronic controller 62 is configured to control the transmission device 42 in the first control state for a predetermined period in a case where the human-powered vehicle 10 starts to travel until a vehicle state of the human-powered vehicle 10 becomes a predetermined state. Further, the electronic controller 62 is configured to switch from the first control state to the second control state in a case where the vehicle state becomes the predetermined state. The electronic controller 62 is configured to switch from the first control state to the third control state in a case where the human driving force input to the human-powered vehicle 10 becomes greater than a predetermined driving force during the predetermined period. Shifting of the ratio R is more restricted in the first control state than the second control state and the third control state.

Shifting that decreases the ratio R is, for example, more restricted in the first control state than the second control state. For example, shifting that decreases the ratio R is more restricted in the first control state than the third control state. For example, shifting that decreases the ratio R is more restricted in the first control state than the second control state and the third control state. Shifting that increases the ratio R can be more restricted in the first control state than the second control state and the third control state. Shifting that increases the ratio R and shifting that decreases the ratio R can be more restricted in the first control state than the second control state and the third control state.

The predetermined state corresponds to, for example, a state in which the human-powered vehicle 10 is stably traveling after the human-powered vehicle 10 starts to travel. The predetermined state corresponds to, for example, a state in which the shifting condition will not be satisfied too often in the second control state after the human-powered vehicle 10 starts to travel. The predetermined state includes, for example, a state in which the vehicle speed is greater than or equal to a first vehicle speed. For example, the first vehicle speed is between 10 km per hour and 20 km per hour, inclusive. For example, the first vehicle speed is 15 km per hour. The predetermined state includes, for example, a state in which an action request for the transmission device 42 is generated. For example, an action request for the transmission device 42 corresponds to an operation of the shift operation device 44 performed by a rider. The predetermined state includes, for example, a state in which the rotational speed of the crank axle 12 is greater than or equal to a first rotational speed. For example, the first rotational speed is between 40 rpm and 60 rpm, inclusive. For example, the first rotational speed is 50 rpm. The predetermined state includes, for example, a state in which distance traveled by the human-powered vehicle 10 from a point of time at which the human-powered vehicle 10 starts to travel is greater than or equal to a predetermined distance traveled. For example, the predetermined distance traveled can be a value obtained by multiplying the vehicle speed by the diameter of a tire, which is stored in advance. Alternatively, the predetermined distance traveled can be the rotational angle of the wheel 16.

The electronic controller 62 can be configured to switch from the first control state to the third control state in a case where the human driving force is greater than the predetermined driving force and a parameter related to traveling load, other than the human driving force, is large. The parameter related to traveling load other than the human driving force includes, for example, at least one of vehicle speed, an acceleration value, rotational speed of the crank axle 12, gradient of a road traveled by the human-powered vehicle 10, and the ratio R.

The electronic controller 62 is, for example, configured to switch from the first control state to the third control state in a case where the human driving force is greater than the predetermined driving force and the vehicle speed is less than or equal to a second vehicle speed during the predetermined period. For example, the second vehicle speed is less than the first vehicle speed. The second vehicle speed can be greater than or equal to the first vehicle speed. For example, the second vehicle speed is between 5 km per hour and 15 km per hour, inclusive. For example, the second vehicle speed is 10 km per hour.

The electronic controller 62 is, for example, configured to switch from the first control state to the third control state in a case where the human driving force is greater than the predetermined driving force and an acceleration value of the human-powered vehicle 10 is less than or equal to a first acceleration value during the predetermined period. For example, the acceleration value is an increased amount of the vehicle speed per unit time period. For example, the unit time period corresponds to a detection cycle of the vehicle speed detector 46. The acceleration value can be an acceleration rate. For example, the first acceleration value is set to a value allowing for determination that the human-powered vehicle 10 started to travel on an uphill road.

The electronic controller 62 is, for example, configured to switch from the first control state to the third control state in a case where the human driving force is greater than the predetermined driving force and the rotational speed of the crank axle 12 is less than or equal to a second rotational speed during the predetermined period. For example, the second rotational speed is less than the first rotational speed. The second rotational speed can be greater than or equal to the first rotational speed. For example, the second rotational speed is between 30 rpm and 50 rpm, inclusive. For example, the second rotational speed is 40 rpm.

The electronic controller 62 is, for example, configured to switch from the first control state to the third control state in a case where the human driving force is greater than the predetermined driving force and the gradient of a road traveled by the human-powered vehicle 10 is greater than or equal to a predetermined gradient during the predetermined period.

The electronic controller 62 is, for example, configured to switch from the first control state to the third control state in a case where the human driving force is greater than the predetermined driving force and the ratio R is greater than or equal to a predetermined ratio R during the predetermined period.

Figure 3:
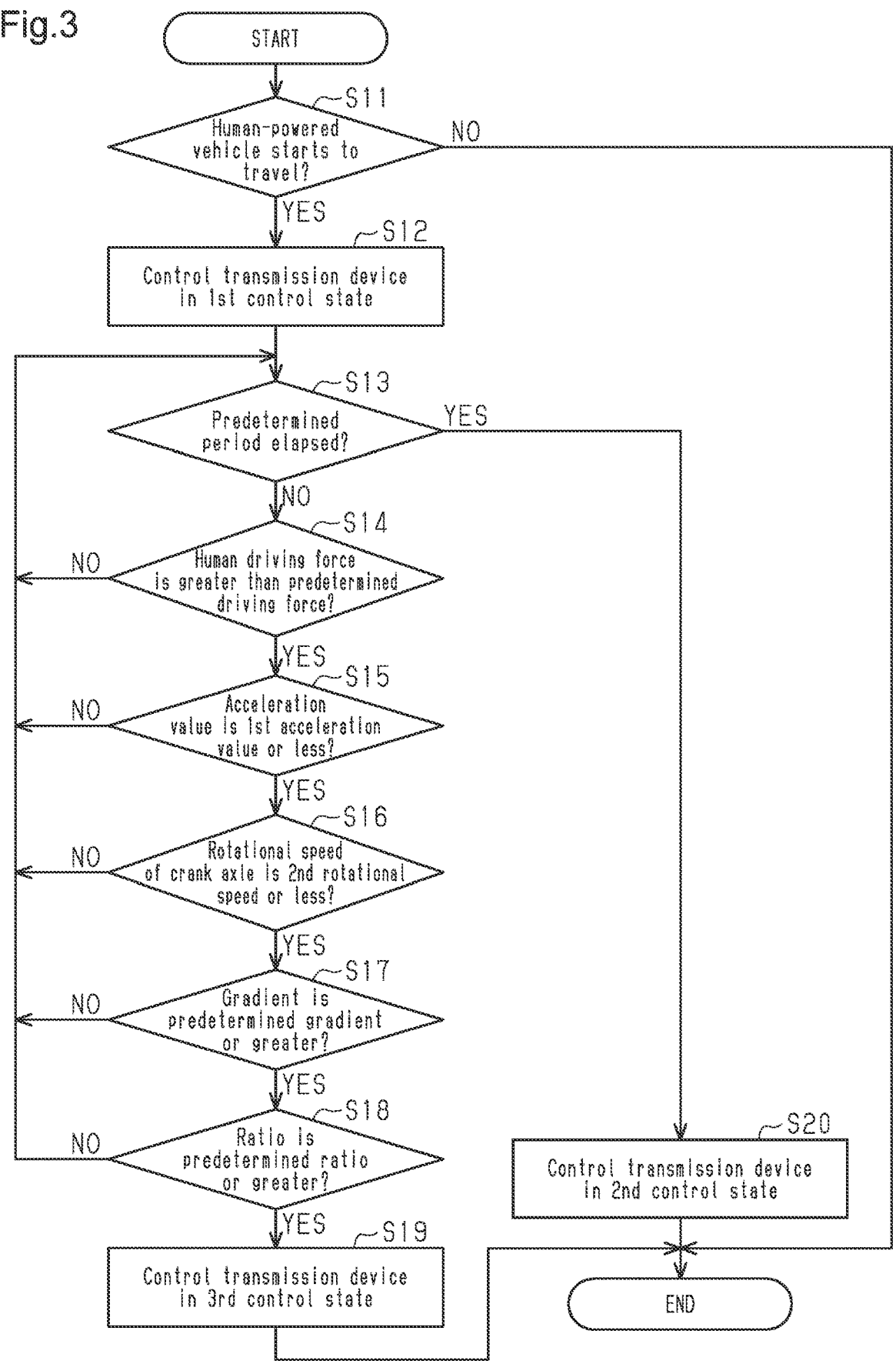
FIG. 3 is a flowchart illustrating a control process executed by a controller of FIG. 2 to control a transmission device.

A control process executed by the electronic controller 62 to control the transmission device 42 will now be described with reference to FIG. 3. For example, in a case where electric power is supplied to the electronic controller 62, the electronic controller 62 starts the process of the flowchart shown in FIG. 3 from step S11. In a case where the process of the flowchart shown in FIG. 3 ends, the electronic controller 62 repeats the process from step S11 in predetermined cycles until, for example, the supply of electric power stops.

In step S11, the electronic controller 62 determines whether the human-powered vehicle 10 starts to travel. For example, the electronic controller 62 determines that the human-powered vehicle 10 started to travel in a case where the vehicle speed of the human-powered vehicle 10 becomes greater than or equal to a travel start determination vehicle speed. For example, the electronic controller 62 determines that the human-powered vehicle 10 has started to travel in a case where the rotational speed of the crank axle 12 becomes greater than or equal to a travel start determination speed. For example, the electronic controller 62 determines that the human-powered vehicle 10 has started to travel in a case where the human driving force becomes greater than or equal to a travel start determination driving force. In a case where the human-powered vehicle 10 does not start to travel, the electronic controller 62 ends processing. In a case where the human-powered vehicle 10 starts to travel, the electronic controller 62 proceeds to step S12.

In step S12, the electronic controller 62 controls the transmission device 42 in the first control state, and then proceeds to step S13. In step S13, the electronic controller 62 determines whether the predetermined period elapsed. For example, the electronic controller 62 determines that the predetermined period has elapsed in a case where the state of the human-powered vehicle 10 is the predetermined state. In a case where the predetermined period has not elapsed, the electronic controller 62 proceeds to step S14.

In step S14, the electronic controller 62 determines whether the human driving force is greater than the predetermined driving force. In a case where the human driving force is not greater than the predetermined driving force, the electronic controller 62 returns to step S13. In a case where the human driving force is greater than the predetermined driving force, the electronic controller 62 proceeds to step S15.

In step S15, the electronic controller 62 determines whether the acceleration value is less than or equal to the first acceleration value. In a case where the acceleration value is not less than or equal to the first acceleration value, the electronic controller 62 returns to step S13. In a case where the acceleration value is less than or equal to the first acceleration value, the electronic controller 62 proceeds to step S16.

In step S16, the electronic controller 62 determines whether the rotational speed of the crank axle 12 is less than or equal to the second rotational speed. In a case where the rotational speed of the crank axle 12 is not less than or equal to the second rotational speed, the electronic controller 62 returns to step S13. In a case where the rotational speed of the crank axle 12 is less than or equal to the second rotational speed, the electronic controller 62 proceeds to step S17.

In step S17, the electronic controller 62 determines whether the gradient of the road traveled by the human-powered vehicle 10 is greater than or equal to the predetermined gradient. In a case where the gradient is not greater than or equal to the predetermined gradient in step S17, the electronic controller 62 returns to step S13. In a case where the gradient is greater than or equal to the predetermined gradient, the electronic controller 62 proceeds to step S18.

In step S18, the electronic controller 62 determines whether the ratio R is greater than or equal to the predetermined ratio R. In a case where the ratio R is not greater than or equal to the predetermined ratio R, the electronic controller 62 returns to step S13. In a case where the ratio R is greater than or equal to the predetermined ratio R, the electronic controller 62 proceeds to step S19.

In step S19, the electronic controller 62 controls the transmission device 42 in the third control state, and then ends processing. In a case where the predetermined period has elapsed in step S13, the electronic controller 62 proceeds to step S20. In step S20, the electronic controller 62 controls the transmission device 42 in the second control state, and then ends processing.

In a case where the third control state is the same as the second control state, step S19 can be omitted. In this case, if an affirmative determination is given in step S18, the electronic controller 62 can proceed to step S20. Steps S14 to S18 can be executed in any order. At least one of steps S15 to S18 can be omitted.

In an example in which the shifting condition includes the rotational speed of the crank axle 12 and the rotational speed of the crank axle 12 is less than the lower limit threshold value, if the transmission device 42 is controlled to decrease the ratio R, the ratio R will have a tendency to decrease because the rotational speed of the crank axle 12 is low in a case where the human-powered vehicle 10 starts to travel. In a case where shifting that decreases the ratio R is more restricted in the first control state than the second control state, shifting that decreases the ratio R is restricted until the traveling state of the human-powered vehicle 10 becomes stable after the human-powered vehicle 10 starts to travel. Therefore, the rider is less likely to feel awkward. In a case where shifting that decrease the ratio R is more restricted in the first control state than the third control state, if the control state is shifted to the third state, shifting that decreases the ratio R is facilitated even before the traveling state of the human-powered vehicle 10 becomes stable after the human-powered vehicle 10 starts to travel. This reduces the load on the rider.

The electronic controller 62 is, for example, configured to select either one of a first mode or a second mode. The predetermined driving force for a case where the first mode is selected differs from the predetermined driving force for a case where the second mode is selected.

The first mode corresponds to, for example, a mode for a case where the human-powered vehicle 10 travels on a mountain trail. The second mode corresponds to, for example, a mode for a case where the human-powered vehicle 10 travels in a town. For example, the predetermined driving force for a case where the first mode is selected is less than the predetermined driving force for a case where the second mode is selected. The predetermined driving force for a case where the first mode is selected can be greater than or equal to the predetermined driving force for a case where the second mode is selected.

The parameter related to traveling load other than the human driving force for a case where the first mode is selected can differ from the parameter related to traveling load other than the human driving force for a case where the second mode is selected. For example, in a case where the parameter related to traveling load other than the human driving force includes the ratio R, the predetermined ratio R for a case where the first mode is selected is less than the predetermined ratio R for a case where the second mode is selected. The predetermined ratio R for a case where the first mode is selected can be greater than or equal to the predetermined ratio R for a case where the second mode is selected. The predetermined ratio R for a case where the first mode is selected can be the smallest ratio R.

The electronic controller 62 is, for example, configured to select either one of the first mode or the second mode in accordance with a request to change the mode. For example, a request to change the mode is generated in a case where an operating device is operated. The operating device includes, for example, at least one of a cycle computer and a smartphone. The electronic controller 62 can be configured to determine that a request to change the mode is generated based on an output from a sensor provided on the human-powered vehicle 10.

Figure 4:
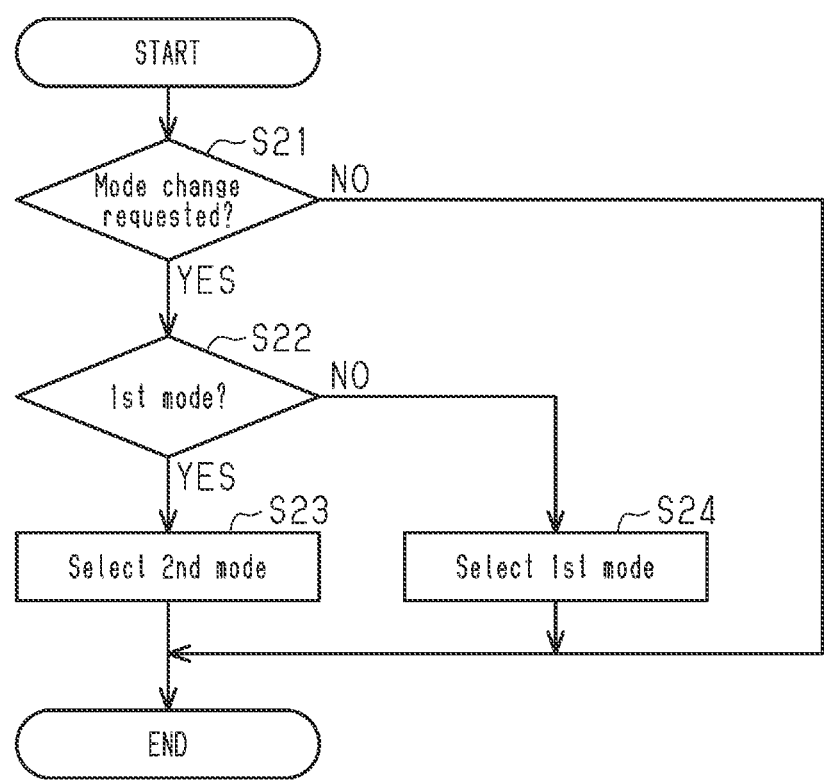
FIG. 4 is a flowchart illustrating a control process executed by the electronic controller of FIG. 2 to change a mode.

A control process executed by the electronic controller 62 to change the mode will now be described with reference to FIG. 4. For example, in a case where electric power is supplied to the electronic controller 62, the electronic controller 62 starts the process of the flowchart shown in FIG. 4 from step S21. In a case where the process of the flowchart shown in FIG. 4 ends, the electronic controller 62 repeats the process from step S21 in predetermined cycles until, for example, the supply of electric power stops.

In step S21, the electronic controller 62 determines whether a request to change the mode is generated. In a case where a request to change the mode is not generated, the electronic controller 62 ends processing. In a case where a request to change the mode is generated, the electronic controller 62 proceeds to step S22.

In step S22, the electronic controller 62 determines whether the mode is the first mode. In a case where the mode is the first mode, the electronic controller 62 proceeds to step S23. In step S23, the electronic controller 62 selects the second mode, and ends processing. In a case where the mode is not the first mode in step S22, the electronic controller 62 proceeds to step S24. In step S24, the electronic controller 62 selects the first mode, and ends processing.

Modifications

The descriptions related to the above embodiment exemplifies, without any intention to limit, an applicable form of a control device for a human-powered vehicle according to the present disclosure. In addition to the embodiment described above, the control device for a human-powered vehicle according to the present disclosure is applicable to, for example, modifications of the above embodiment that are described below and combinations of at least two of the modifications that do not contradict each other. In the modifications described hereafter, same reference numerals are given to those components that are the same as the corresponding components of the above embodiment and such components will not be described in detail.

The electronic controller 62 can be configured to control the transmission device 42 in the first control state for the predetermined period in a case where the human-powered vehicle 10 starts to travel until the vehicle state of the human-powered vehicle 10 becomes a first predetermined state. The electronic controller 62 can be configured to switch from the first control state to the second control state in a case where the vehicle state becomes the first predetermined state. The electronic controller can be configured to switch from the first control state to the third control state in a case where the vehicle state becomes a second predetermined state during the predetermined period. Shifting of the ratio R can be more restricted in the first control state than the second control state and the third control state. The first predetermined state includes at least one of a state in which vehicle speed is greater than or equal to the first vehicle speed, a state in which an action request for the transmission device 42 is generated, a state in which the rotational speed of the crank axle 12 is greater than or equal to the first rotational speed, and a state in which distance travelled by the human-powered vehicle 10 from a point of time at which the human-powered vehicle 10 starts to travel is greater than or equal to the predetermined distance traveled. The second predetermined state includes a state in which the human driving force input to the human-powered vehicle 10 is greater than the predetermined driving force and at least one of a state in which the vehicle speed is less than the second vehicle speed that is lower than the first vehicle speed, a state in which an acceleration value of the human-powered vehicle 10 is less than or equal to the first acceleration value, a state in which the rotational speed of the crank axle 12 is less than or equal to the second rotational speed that is lower than the first rotational speed, a state in which gradient of a road traveled by the human-powered vehicle 10 is greater than or equal to the predetermined gradient, and a state in which the ratio R is greater than or equal to the predetermined ratio R.

Figure 5:
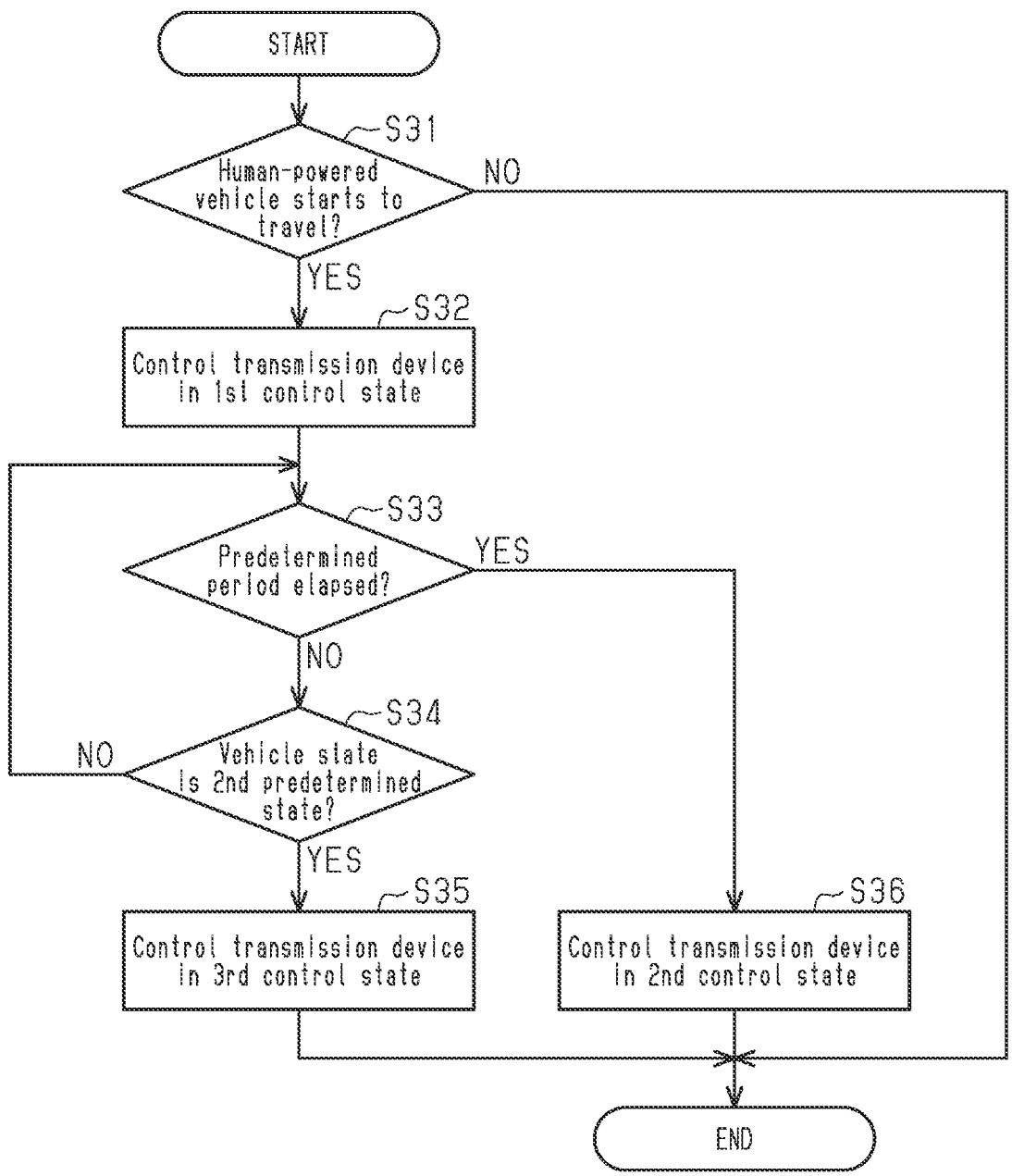
FIG. 5 is a flowchart illustrating a control process executed by an electronic controller of in accordance with one modification to control a transmission device.

A process executed by the electronic controller 62 to control the transmission device 42 will now be described with reference to FIG. 5. For example, in a case where electric power is supplied to the electronic controller 62, the electronic controller 62 starts the process of the flowchart shown in FIG. 5 from step S31. In a case where the process of the flowchart shown in FIG. 5 ends, the electronic controller 62 repeats the process from step S31 in predetermined cycles, for example, until the supply of electric power stops.

In step S31, the electronic controller 62 determines whether the human-powered vehicle 10 starts to travel. In a case where the human-powered vehicle 10 does not start to travel, the electronic controller 62 ends processing. In a case where the human-powered vehicle 10 starts to travel, the electronic controller 62 proceeds to step S32.

In step S32, the electronic controller 62 controls the transmission device 42 in the first control state, and then proceeds to step S33. In step S33, the electronic controller 62 determines whether the predetermined period elapsed. In a case where the predetermined period has not elapsed, the electronic controller 62 proceeds to step S34.

In step S34, the electronic controller 62 determines whether the vehicle state is the second predetermined state. In a case where the vehicle state is not the second predetermined state, the electronic controller 62 returns to step S33. In a case where the vehicle state is the second predetermined state, the electronic controller 62 proceeds to step S35.

In step S35, the electronic controller 62 controls the transmission device 42 in the third control state, and then ends processing. In a case where the predetermined period has elapsed in step S33, the electronic controller 62 proceeds to step S36. In step S36, the electronic controller 62 controls the transmission device 42 in the second control state, and then ends processing.

In a case where the third control state is the same as the second control state, step S35 can be omitted. In this case, if an affirmative determination is given in step S34, the electronic controller 62 can proceed to step S36.

The phrase "at least one of" as used in this disclosure means "one or more" of a desired choice. As one example, the phrase "at least one of" as used in this disclosure means "only one choice" or "both of two choices" in a case where the number of choices is two. In another example, the phrase "at least one of" as used in this disclosure means "only one single choice" or "any combination of two or more choices" if the number of its choices is three or more.

What is claimed is:

1. A control device for a human-powered vehicle, the control device comprising:
    an electronic controller configured to control a transmission device that shifts a ratio of a rotational speed of a wheel of the human-powered vehicle to a rotational speed of a crank axle of the human-powered vehicle, wherein:
    the electronic controller is configured to control the transmission device in one of a first control state, a second control state, and a third control state;
    the electronic controller is configured to control the transmission device in the first control state for a predetermined period in a case where the human-powered vehicle starts to travel until a vehicle state of the human-powered vehicle becomes a predetermined state;
    the electronic controller is configured to switch from the first control state to the second control state in a case where the vehicle state becomes the predetermined state;
    the electronic controller is configured to switch from the first control state to the third control state in a case where a human driving force input to the human-powered vehicle becomes greater than a predetermined driving force during the predetermined period; and
    shifting of the ratio is more restricted in the first control state than the second control state and the third control state.

2. The control device according to claim 1, wherein shifting that decreases the ratio is more restricted in the first control state than the second control state.

3. The control device according to claim 1, wherein shifting that decreases the ratio is more restricted in the first control state than the third control state.

4. The control device according to claim 1, wherein shifting that decreases the ratio is more restricted in the first control state than the second control state and the third control state.

5. The control device according to claim 1, wherein the predetermined state includes a state in which a vehicle speed is greater than or equal to a first vehicle speed.

6. The control device according to claim 1, wherein the predetermined state includes a state in which an action request for the transmission device is generated.

7. The control device according to claim 1, wherein the predetermined state includes a state in which the rotational speed of the crank axle is greater than or equal to a first rotational speed.

8. The control device according to claim 1, wherein the predetermined state includes a state in which a distance traveled by the human-powered vehicle from a point of time at which the human-powered vehicle starts to travel is greater than or equal to a predetermined distance traveled.

9. The control device according to claim 1, wherein the electronic controller is configured to switch from the first control state to the third control state in a case where the human driving force is greater than a predetermined driving force and a vehicle speed is less than or equal to a second vehicle speed during the predetermined period.

10. The control device according to claim 1, wherein the electronic controller is configured to switch from the first control state to the third control state in a case where the human driving force is greater than a predetermined driving force and an acceleration value of the human-powered vehicle is less than or equal to a first acceleration value during the predetermined period.

11. The control device according to claim 1, wherein the electronic controller is configured to switch from the first control state to the third control state in a case where the human driving force is greater than a predetermined driving force and the rotational speed of the crank axle is less than or equal to a second rotational speed during the predetermined period.

12. The control device according to claim 1, wherein the electronic controller is configured to switch from the first control state to the third control state in a case where the human driving force is greater than a predetermined driving force and a gradient of a road traveled by the human-powered vehicle is greater than or equal to a predetermined gradient during the predetermined period.

13. The control device according to claim 1, wherein the electronic controller is configured to switch from the first control state to the third control state in a case where the human driving force is greater than a predetermined driving force and the ratio is greater than or equal to a predetermined ratio during the predetermined period.

14. A control device for a human-powered vehicle, the control device comprising:
an electronic controller configured to control a transmission device that shifts a ratio of a rotational speed of a wheel of the human-powered vehicle to a rotational speed of a crank axle of the human-powered vehicle, wherein:
the electronic controller is configured to control the transmission device in one of a first control state, a second control state, and a third control state;
the electronic controller is configured to control the transmission device in the first control state for a predetermined period in a case where the human-powered vehicle starts to travel until a vehicle state of the human-powered vehicle becomes a first predetermined state;
the electronic controller is configured to switch from the first control state to the second control state in a case where the vehicle state becomes the first predetermined state;
the electronic controller is configured to switch from the first control state to the third control state in a case where the vehicle state becomes a second predetermined state during the predetermined period;
shifting of the ratio is more restricted in the first control state than the second control state and the third control state;
the first predetermined state includes at least one of a state in which a vehicle speed is greater than or equal to a first vehicle speed, a state in which an action request for the transmission device is generated, a state in which the rotational speed of the crank axle is greater than or equal to a first rotational speed, and a state in which a distance travelled by the human-powered vehicle from a point of time at which the human-powered vehicle starts to travel is greater than or equal to a predetermined distance traveled; and
the second predetermined state includes a state in which a human driving force input to the human-powered vehicle is greater than a predetermined driving force and at least one of a state in which the vehicle speed is less than a second vehicle speed that is lower than the first vehicle speed, a state in which an acceleration value of the human-powered vehicle is less than or equal to a first acceleration value, a state in which the rotational speed of the crank axle is less than or equal to a second rotational speed that is lower than the first rotational speed, a state in which a gradient of a road traveled by the human-powered vehicle is greater than or equal to a predetermined gradient, and a state in which the ratio is greater than or equal to a predetermined ratio.

15. The control device according to claim 1, wherein the electronic controller is configured to control the transmission device in accordance with a shifting condition in the first control state, the second control state, and the third control state.

16. The control device according to claim 15, wherein the shifting condition is related to at least one of a traveling state of the human-powered vehicle and a traveling environment of the human-powered vehicle.

17. The control device according to claim 15, wherein the shifting condition includes at least one of the rotational speed of the crank axle, the human driving force, and a vehicle speed.

18. The control device according to claim 15, wherein:
the shifting condition includes the rotational speed of the crank axle;
the electronic controller is configured to control the transmission device to increase the ratio in a case where the rotational speed of the crank axle is greater than an upper limit threshold value; and
the electronic controller is configured to control the transmission device to decrease the ratio in a case where the rotational speed of the crank axle is less than a lower limit threshold value.

19. The control device according to claim 1, wherein:
the electronic controller is configured to select either one of a first mode and a second mode; and
the predetermined driving force for a case where the first mode is selected differs from the predetermined driving force for a case where the second mode is selected.

* * * * *